(12) United States Patent
Havner et al.

(10) Patent No.: US 6,854,111 B1
(45) Date of Patent: *Feb. 8, 2005

(54) LIBRARY MANAGER FOR AUTOMATED PROGRAMMING OF INDUSTRIAL CONTROLS

(75) Inventors: Randall A. Havner, Atlanta, GA (US); Stephen D. Ryan, Vernon, WI (US); James F. Toman, Temecula, CA (US); Clifford J. Whitehead, Jr., Cleveland, OH (US); Kam P. Yuen, Menomonee Falls, WI (US)

(73) Assignee: Rockwell Software Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/404,772

(22) Filed: Sep. 24, 1999

(51) Int. Cl.[7] .......................... G06F 9/44; G05B 11/01; G05B 19/42
(52) U.S. Cl. .................. 717/163; 717/162; 717/164; 700/17; 700/86
(58) Field of Search .................. 717/162, 163, 717/164; 700/86, 17

(56) References Cited

U.S. PATENT DOCUMENTS

| | | | | |
|---|---|---|---|---|
| 5,448,740 A | * | 9/1995 | Kiri et al. .................... | 717/117 |
| 5,485,620 A | * | 1/1996 | Sadre et al. .................. | 717/162 |
| 5,576,946 A | * | 11/1996 | Bender et al. ................ | 700/17 |
| 5,594,858 A | * | 1/1997 | Blevins ....................... | 345/747 |
| 5,611,059 A | * | 3/1997 | Benton et al. ................ | 700/17 |
| 5,801,942 A | * | 9/1998 | Nixon et al. .................. | 700/17 |
| 5,812,394 A | * | 9/1998 | Lewis et al. .................. | 700/17 |
| 5,822,206 A | * | 10/1998 | Sebastian et al. ............. | 700/97 |
| 6,161,051 A | * | 12/2000 | Hafemann et al. ............ | 700/17 |
| 6,237,004 B1 | * | 5/2001 | Dodson et al. ............. | 707/102 |
| 6,546,297 B1 | * | 4/2003 | Gaston et al. ................ | 700/83 |

* cited by examiner

*Primary Examiner*—Todd Ingberg
*Assistant Examiner*—Qamrun Nahar
(74) *Attorney, Agent, or Firm*—Quarles & Brady LLP; William R. Walbrun

(57) ABSTRACT

A library manager holds related program fragments, for example, control logic fragments and visualization program fragments sharing the same control variables, in library files. Multiple copies of control logic program fragments are instantiated to develop a control program and of the control variable tags for each copy of the control logic program fragments are renamed to prevent conflicts. At a later time, visualization program fragments related to the control logic program fragments are identified by their common origin in the library manger. The control variables of these visual program fragments may then be automatically renamed by using their library files as a guide. The library files may also hold related non-program information.

30 Claims, 3 Drawing Sheets

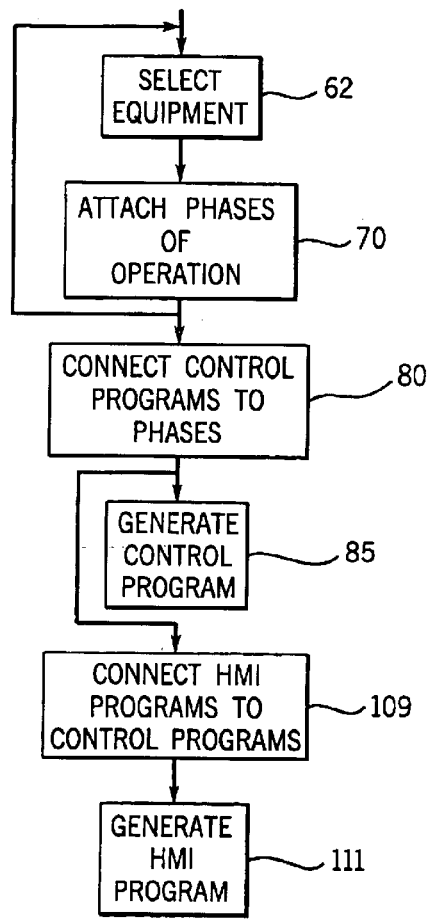
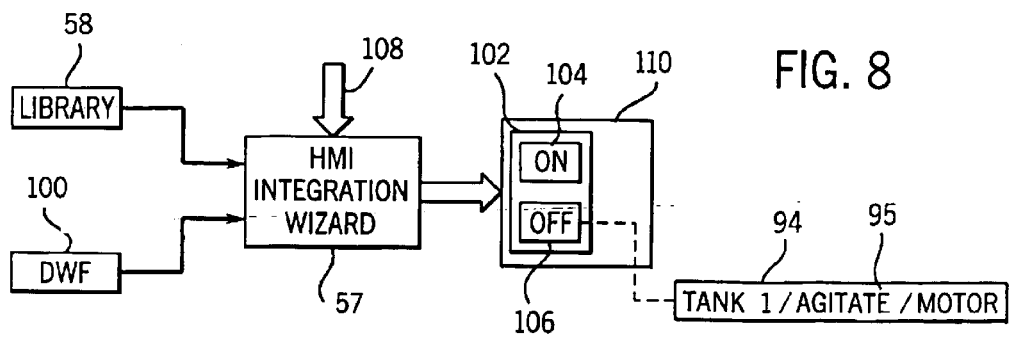

LIBRARY MANAGER FOR AUTOMATED PROGRAMMING OF INDUSTRIAL CONTROLS

CROSS-REFERENCE TO RELATED APPLICATIONS

--

STATEMENT REGARDING FEDERALLY SPONSORED RESEARCH OR DEVELOPMENT

--

BACKGROUND OF THE INVENTION

The present invention relates to industrial controllers for controlling industrial processes or manufacturing equipment and in particular to a method of simplifying the programming of industrial controllers.

Industrial controllers are special purpose computers used for controlling industrial processes or manufacturing equipment. Under the direction of a stored control program, the industrial controller examines a set of inputs reflecting the status of the controlled process and changes a set of outputs controlling the controlled process based on control logic of the control program. The inputs and outputs may be binary, that is on or off, or analog, providing a value within a continuous range. Typically analog signals are converted to binary words for processing.

Unlike conventional computers which normally run standardized applications, industrial controllers often operate programs uniquely tailored for a particular control situation. Accordingly, it is important to be able to efficiently and easily program industrial controllers.

In this regard, it is known to reuse elemental portions of other control program "fragments" in creating the control logic of a control program for a particular job. This may be done by copying the program fragments and inserting them one or more times within the body of the control program to be developed. Generally a control program will include "control logic" portion determining relationships between the process inputs and process outputs and a "visualization" or "human machine interface" (HMI) portion providing a display of the industrial process and a means for operator input.

A characteristic feature of the control logic of a control program is its need to contend with a large number of input and output variables, each corresponding to control points on the controlled process. The input and output variables of the reused program control logic fragments, when integrated into the body of the control program being developed, must be re-named and cross referenced so as to preserve the uniqueness of the variable names for each program fragment and so as to keep track of the variable's relationship both to the controlled process and to the program fragment of which it is a part. This renaming and cross-referencing is a laborious task.

After the control logic is complete, a human machine interface (HMI) may be developed. As mentioned above, the HMI portion of the control program may provide for software control or monitoring of input and output variables and of the controlled process itself. Such monitoring may use one or more virtual controls (e.g., pushbuttons or the like displayed on a computer monitor) and/or animations of equipment during particular input and output states. The program fragment underlying each virtual control or animation may be reused in the same way that program fragments are reused for the control logic. Such reuse imposes a similar burden in renaming input and output variables, and the additional burden of cross-referencing of the variables of the HMI program fragments to the variables of the control logic which they portray.

HMI program fragments cannot normally be preconnected to corresponding control logic because this limits the programmer's flexibility to omit HMI for some control logic and to use multiple HMI for other control logic. Connecting HMI program fragments to the appropriate control logic program fragments after the control logic fragments have been integrated into the body of a larger program is complicated by the necessity of renaming of the control logic fragments and their variables during this integration process.

What is needed is a method of identifying related program fragments and maintaining consistency among the variables of related program fragments even after the program fragments have been integrated into a control program.

BRIEF SUMMARY OF THE INVENTION

The present invention provides a tool for simplifying the development of control programs through the use of a library manager which organizes related groupings of pre-developed program fragments and other information including non-program information into library files. Under the invention, the renaming of variables of the program fragments, incident to their reuse in a larger control program, is done in a way to preserve the identity of their originating library file. In this way, other program fragments of the same library file may later be automatically identified and connected to integrated program fragments after the variables of the integrated program fragments and the program fragments themselves have been renamed.

Specifically then, the present invention provides a library system for creating programs executable on an industrial controller to control an industrial process. The library system includes a library manager collecting in named files, first and second program fragments having shared control variables representing physical inputs or outputs exchanged with the industrial process. The shared control variables have common tags. The invention also includes a first program builder accepting user input to link in a first linking process instances of first program fragments together from files in the library manager to create a first portion of the control program. The first program builder renames tags of control variables of duplicate instances of first program fragments to be unique. A second program builder accepts information about the first linking process and user input to create a second portion of the control program from second program fragments taken from the same files as the first program fragments. The second program builder renames the tags of the control variables of the second program fragments to comport with the renaming of the tags of the control variables of the first portions by the first program builder.

Thus it is one object of the invention to allow related program fragments to communicate with each other even after the renaming of their variables incident to incorporation of the program fragments into a larger program.

The second program builder may also accept information about the files of the library manger from which the instances of the first program fragments originate, so to display to a user only second program fragments related to the first program fragments.

Thus it is another object of the invention to be able to identify related program fragments even after instantiation of some program files in a larger program.

The renaming of the first and second program fragments by the first and second program builders may employ a part of the common name of their unique file of the library manager.

Thus it is another object of the invention to provide a simple means of tracking the identity and compatibility of program fragments after instantiation of those program files in a larger program.

The files of the library manager may denote phases of operation of a machine of the controlled process and the files may also include information related to the phase of operation denoted by the file and not necessarily a program fragment.

Thus it is another object of the invention to provide a convenient mechanism for collecting related files of any kind as may be used to construct a control program for industrial control.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE SEVERAL VIEWS OF THE DRAWINGS

FIG. 3 is a flow chart showing a sequence of operations using the development tool of the present invention in generating an area-model and connecting program fragments using the area-model as a framework;

FIG. 8 is a data flow diagram showing use of the HMI integration wizard suing the wizard file with the HMI editor to produce and attach HMI program fragments to the control program previously produced and to correctly rename the variables to provide for inner communication between these program fragments and the control program previously produced.

DETAILED DESCRIPTION OF THE INVENTION

Figure 1:
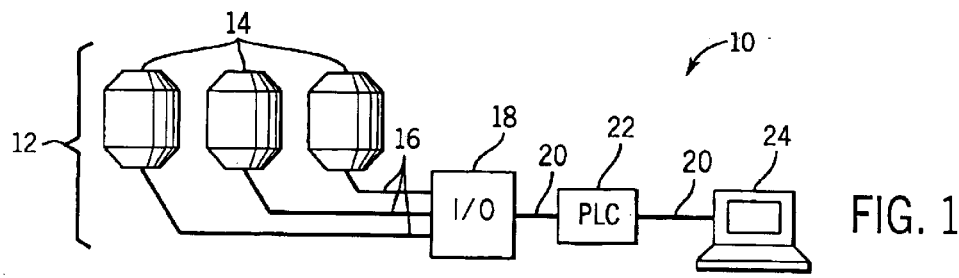
FIG. 1 is a simplified block diagram of an industrial controller communicating with equipment of a controlled process to receive inputs from the controlled process and transmitting outputs to the controlled process through an I/O module, the industrial controller further communicating with a programming terminal.

Referring now to FIG. 1, an industrial control system 10 is used to control a process 12 which, for example, may include several tanks 14 operating according to control variables communicated over lines 16. The control variables may be output signals controlling actuators or the like on the tanks 14 or may be inputs from sensors on the tanks 14 such as temperature sensors or motion sensors or level sensors.

The lines 16 are received by I/O circuits 18 providing for basic signal processing known in the art and for the conversion between analog signals and digital values for computer processing. The digital values may be communicated over link 20 between the I/O circuits 18 and a programmable logic controller 22. The programmable logic controller 22 also communicates either over link 20 or a separate link with a programming terminal 24 such as may be a conventional desktop computer.

Figure 2:
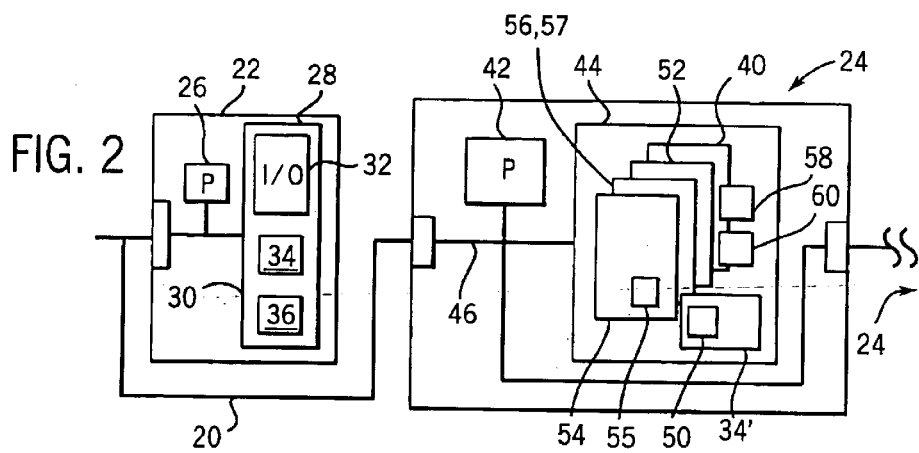
FIG. 2 is a detailed block diagram of the industrial controller and programming terminal of FIG. 1 showing the processor and memory of the programming terminal, the latter holding an operating system and a copy of the control program including an HMI program, as well as the development tools of the present invention including an area-model developer, a library of program fragments, two program integration wizards for connecting program fragments, the resultant area-model, and connection file.

Referring now to FIG. 2, the programmable logic controller 22 includes at least one processor 26 connected with an internal memory 28 via a bus 30 also communicating with link 20. The memory 28 includes an I/O table storing values of the control variables received from or transmitted to the I/O circuits 18, a control program 34 reading those I/O values and executing a control logic prepared by a programmer specifically for the controlled process 12, and various operating system programs 36 well understood in the art.

The control program 34 may be generated by the programming terminal 24 and downloaded from a control program copy 34' stored in memory 44 therein. The control logic of the control program copy 34' may be generated by a control logic developer 40 such as a function block programming language including, for example, the RS Logic Frameworks™ program manufactured by Rockwell Software Inc. of Wisconsin, the assignee of the present invention or other well known function block programming languages manufactured by others. Alternatively, the control logic may be written in other well-known languages including structured text, ladder logic or sequential function chart languages all well know in the art for which editors and compiler are readily available commercially The control logic developer 40 is executed on a processor 42 associated with the programming terminal 24, the processor 42 communicating via an internal bus 46 with the link 20 and the memory 44.

The memory 44 of the programming terminal also holds the control logic developer 40 for developing control logic and the control program copy 34'. The control program copy 34' always includes control logic but may include or be associated with a human machine interface HMI program 50, the latter which may remain on the programming terminal 24 to work in conjunction with the remainder of the control program 34 downloaded to the programmable logic controller 22 to provide an interface to the ongoing controlled process 12. This interface may provide for virtual controls that may display control variables or force control variables to particular values or animations or the like of the controlled process 12. The HMI program 50 may be generated by an HMI developer 52 such as the RS View 32™ language manufactured by the assignee of the present invention or other similar HMI scripting languages known in the art and also held in memory 44.

The memory 44 of the programming terminal 24 also includes an area-model developer 54, the resultant area-model 55, two program integration wizards 56 and 57, a connection file 60 produced by the one of the wizards 56 and 57, and a library 58 of program fragments all as will be described in more detail below.

Generally the present invention will make use of program fragments stored in the library 58 to assemble the downloadable control program copy 34' and the HMI program 50. Importantly, however, the assembly follows the step of generating the area-model 55 which is used as a framework to coordinate this process and to greatly reduce the amount of work necessary to properly designate input and output variables.

Figure 4:
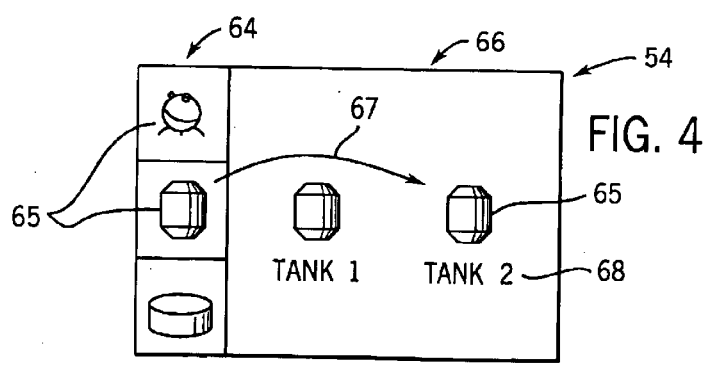
FIG. 4 is a view of a screen of the programming terminal of FIG. 1 during use of the area-model developer of the present invention in identifying equipment of an area-model.

Referring now to FIGS. 3 and 4, in the first steps of the present invention, indicated by process blocks 62 and 70 of FIG. 3, the area-model 55 is developed for the particular controlled process 12 (shown in FIG. 1). The area-model 55 conforms generally to the S88 standard mentioned above and is constructed through user interaction with a development screen of the area-model developer 54. Specifically, at the first process block 62, equipment for the area-model 55 is selected corresponding to the equipment of the controlled process 12 using a graphical interface presenting a left-hand palette 64 of various equipment icons 65 and a right-side workspace 66 representing the area-model 55 to be developed into which the equipment icons 65 may be dragged using a conventional "click and drag" technique known for use with user input devices such as a computer mouse or trackball.

As equipment icons 65 are dragged to the workspace 66, they are given a unique text tag 68. The tag 68 may be entered by the user to the keyboard of the programming terminal 24 holding the area-model developer 54. However the area-model developer 54 nevertheless monitors the entered tag 68 to ensure that no two icons 65 for equipment have the same tag 68. In a preferred embodiment, the area-model developer 54 accepts an arbitrary tag 68 for the first equipment icon 65 of a given equipment type and for each subsequent equipment icon 65 of that same type, appends to that tag 68 an integer number in sequence. So for example, if the user adds an equipment icon 65 representing a tank, using the word "tank" as the tag 68, subsequent equipment icons 65 of the tank-type adopt the tags 68 of "tank 2", "tank 3" and so forth automatically. The area-model developer 54 also ensures that unique tags 68 are assigned even to equipment icons 65 of different types. During this process, the tag 68 is entered into a list that forms part of the area-model 55 which is stored in memory 44. In the example of FIG. 4, two tanks named "tank1" and "tank2" are added to the area-model 55.

Figure 5:
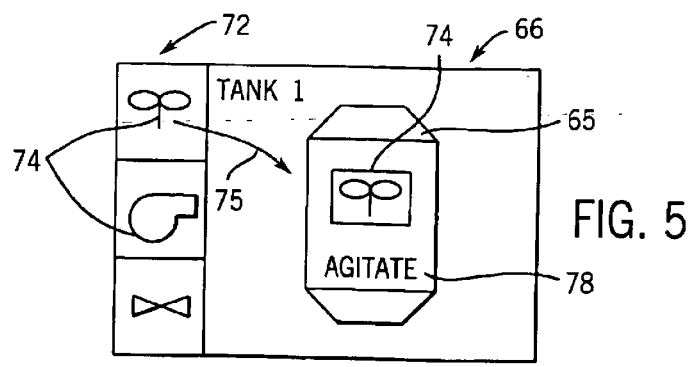
FIG. 5 is a figure similar to that of FIG. 4 showing the association of phases of operation to the equipment of the area-model identified in FIG. 4.

Referring now to FIGS. 3 and 5 at process block 70, the area-model developer 54 provides a new screen having a left side palette 72 listing various "phase of operation" icons 74 representing operations that may be associated with the equipment icons 65. For the purpose of matching phase of operation icons 74 to equipment icons 65, the workspace 66 shows a single equipment icon 65 in enlarged form indicating the particular piece of equipment to which the phases of operation will be attached. Again using the "drag and drop" technique, phase of operation icons 74 may be dragged to the workspace 66 to be affiliated with the particular piece of equipment having focus in workspace 66 as indicated by arrow 75. As before, each phase of operation icons 74 is given a unique tag 78 that may be arbitrarily selected by the user to comport with the terminology of the controlled process 12. Again the area-model developer 54 monitors the tags 78 to ensure that for any given piece of equipment represented by an equipment icon 65, there are no two tags for phase of operation icons 74 that are the same. Again this may be accomplished by appending an integer to the tag as additional phase of operation icons 74 of similar type are added to a particular piece of equipment. The list of equipment tags 68 of the area-model 55 is then annotated with the tags 78 of the associated phases of operation icons 74, the latter dependent to make a hierarchical tree structure. In the example of FIG. 5, a phase of operation denoted by the tag "agitate" is added to the equipment of "tank1" and "tank2" (the latter not shown in FIG. 5).

Referring to FIG. 3, the process blocks of 62 and 70 may be repeated until an area-model 55 is generated representing the entire controlled process 12. The essence of the area-model 55 is the hierarchical list of tags 68 and 74.

Once the area-model 55 is completed at process block 80, control program fragments from the library 58 are connected according to the phases of operation of the area-model 55 using the control program integration wizard 56 whose operation will now be described.

Figures 6, 7:
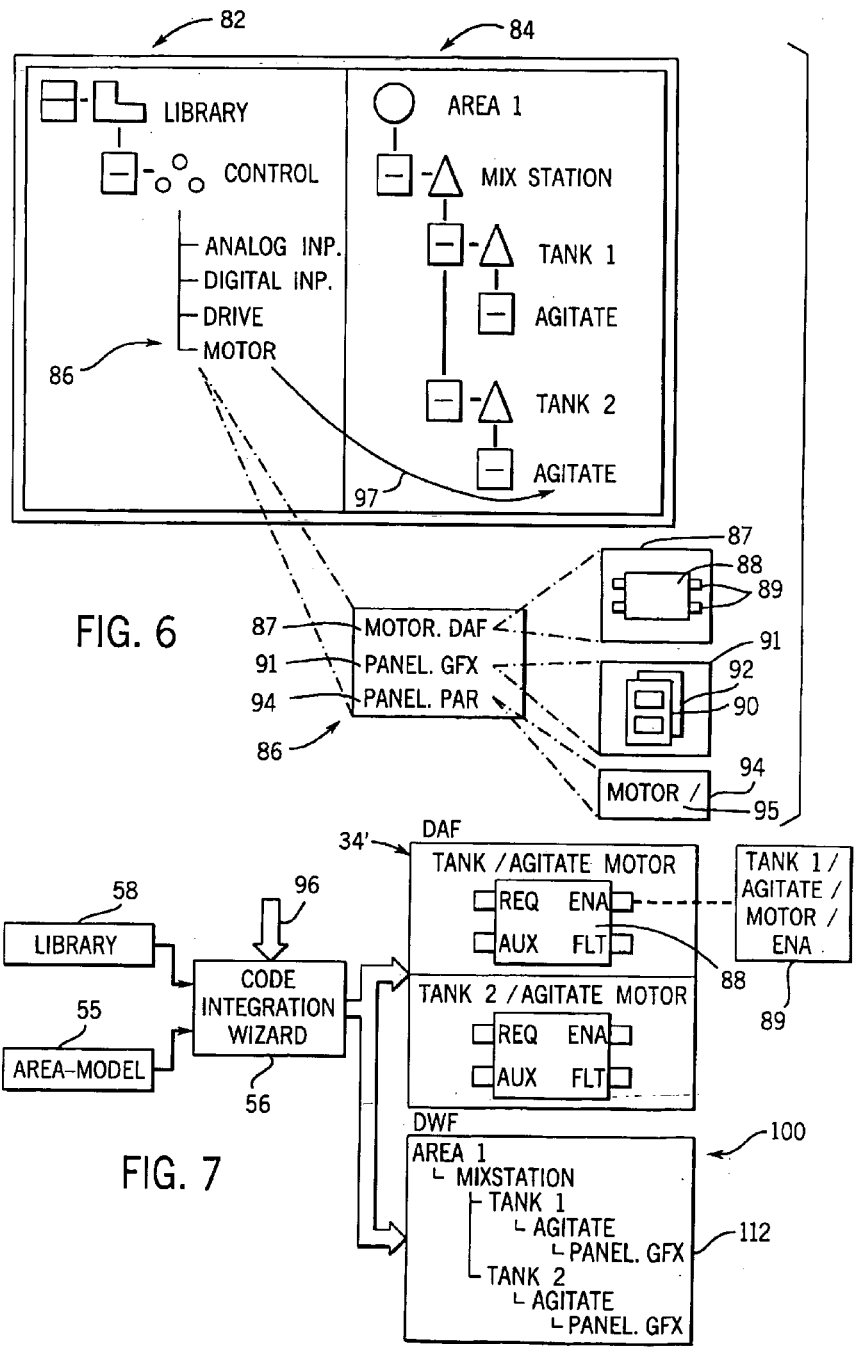
FIG. 6 is a screen display showing operation of a program integration wizard in allowing the user to identify program fragments to various phases of the area-model of FIGS. 4 and 5 and showing the underlying files collected together in the library of the program fragments organized by equipment names.
FIG. 7 is a data flow chart showing operation of the program integration wizard in accepting user input, and library and area-model information to produce a control program and a wizard file used for later connections of other program fragments.

Referring to FIG. 6, the control program integration wizard 56 displays on programming terminal 24 two juxtaposed menus, a library menu 82 (depicted on the left side of FIG. 6) and an area-model menu 84, the latter being the hierarchical list of tags 68 and 78 formed by process blocks 62 and 70. Thus, using the example of FIG. 4, in which two tanks are identified as equipment, and of FIG. 5, wherein the "agitate" phase of operation is linked to each tank, the area-model 55 shows in hierarchical form the tags "tank1" and "tank2" having dependent "agitate" phases underneath them.

The library menu 82, depicted in the left side of the display, provides a directory of program fragments stored in "object templates" 86 in the library 58. These program fragments may be prewritten for particular industries by a vendor or may be prepared by the user using the control logic developer 40. The program fragments can be arbitrarily arranged in object templates 86 but in the preferred embodiment the program fragments are logically grouped in object templates 86, denoted by the names of particular arranged equipment and/or control phases, but not necessarily equipment and/or control phases having the same names as the tags 68 and 78 of the area-model 55. More generally, a given object template 86 in the library 58 will associate a number of different types of data (not necessarily program fragments only) according to any commonality of that data but preferably will include program fragments that share control variables of some kind. Nevertheless, the object templates may provide a logical grouping of the logical files unrelated to physical groupings of equipment such as groupings based on a phase of operation or a process recipe.

The library 58 is constructed using a commercial source code management tool such as Visual SourceSafe commercially available from the Microsoft Corporation of Washington. As such it allows standard organizational methods to be applied to the object templates. For example, the object templates may be collected in folders given arbitrary descriptive names for convenient access and reference by the user and the folders can be collected in libraries given names indicating their use, for example, an we industry name such as "food/beverage". The library allows renaming, copying and deleting of folders, object templates and their data and allows instancing of the data as will be described, on an individual basis, or the instancing of an entire object template at one time. A standard hierarchical display of the folders, object templates, and data is provided as well as standard library features such as monitoring checkout and check-in of documents and revision numbers. Generally an object template may hold references to other object templates.

In the preferred embodiment, a given object template 86 may include a control program fragment 87 (here named "motor") composed of function blocks 88 having input or output variables 89 according to conventions well known in the art (given the suffix DAF) and an HMI file 91 (here termed "panel") providing program fragments for visual HMI controls 90 having underlying control variables 92 (given the suffix GFX). The object template 86 may also include a parameter file 94 (also termed "panel" to link it to the HMI file) indicating a renaming of the variables of the HMI controls 90 and function blocks 88 as will occur during the process to now be described (given the suffix PAR).

Generally the parameter file 94 is in the form of a default value 95 initially defining a prefix applicable to all files of the object template 86. In the example of FIG. 6 the prefix is "motor" indicating the name of the object template 86. Each of the control variables 89 and HMI variables 92 in the various program fragments of the object template 86 take the prefix "motor" to uniquely identify them from other program fragments of other object templates 86.

Referring also to FIGS. 3 and 7, the program fragments of the library 58 are matched to parts of the area-model 55 by the control program integration wizard 56 according to user input 96 as indicated by process block 85 of FIG. 3. Specifically, the user "drag and drop" object templates 86 from menu 82 to phases of operations in menu 84. As this process continues, each of the control program fragments 87 of the DAF files are collected together to form the control program copy 34' and at the same time, the names of the control variables 89 are updated to reflect the hierarchy of the area-model menu 84. Thus for example, a function block 88 from the "motor" DAF file of an object template 86 may include four control variables named REQ indicating a request to activate the motor, AUX indicating that the motor has been actuated, ENA enable indicating an enabling of the motor and FLT indicating a fault with the operation of the motor. Each of these variables is made unique from other variables of other instances of the object template 86 by concatenating onto it first the "motor" prefix from the parameter file 94. Thus the AUX variable becomes "motor\AUX". This distinguishes these control variables from the like named variables of similar function blocks 88 that may be found in other object templates 86. Upon the connection of the program fragment to the area-model, for example the "agitate" phase of operation of "tank1", these tags are also concatenated onto the variable names so that "motor\AUX" becomes "tank1\agitate\motor\AUX".

The program fragments with their control variables, thus renamed, are collected to form the control program copy 34'. Generally, the control program fragments 87 may include many interconnected function blocks 88.

Thus, each function block 88 of a program fragment added in this manner to the control program copy 34' represents but one instance of that program fragment that may be duplicated many times. As noted, the variables 89 of the function block 88 will be uniquely identified so as to not conflict with variables of other program fragments or other instances of this program fragment in the control program copy 34'. While arbitrary renaming of the variables could be performed to prevent conflict, the use of the area-model 55 both provides a logical and intuitive renaming convention and a renaming convention that preserves the fundamental identity of the variables such as may be necessary for the interconnection of control variables 89 between instances of the function blocks 88, or the connection of the control variables 89 to variables 92 of HMI files 91 as will be described below.

The control program integration wizard 56 produces a wizard file 100 (termed a DWF file) providing connection information indicating how the object templates 86 were instantiated to forming the control program copy 34'. In particular, the wizard file 100 provides information about the underlying area-model 55, thus reflecting the format of area-model menu 84 and provides each phase of operation of the area-model 55 in hierarchical form depending from the equipment. Importantly, the wizard file 100 also lists those files of the instantiated object templates 86 other than the control program files 87, thus indicating other related program fragments, such as HMI program fragments, that are related to the program fragments already a part of the control program copy 34' and which may, thus, be connected to the control program copy 34'. While these other files may be files of any kind including graphics, text, or the like, most importantly these files include HMI files 91 that share common input or output variables with the instantiated control program files 87. Thus for example, the file "panel.GFX" may be listed in the wizard file 100 representing a HMI control that shares control variables with the program fragment of "motor.DAF" already incorporated into the control program copy 34'.

Referring now to FIG. 8, as an example, an HMI program fragment: "panel GFX" may provide for a visual button panel 102 having an ON button 104 and an OFF button 106 allowing for control of and indication of the status of a motor controlled by the "motor.DAF" program fragment holding function block 88. Underlying this "panel.GFX" file are variables REQ and AUX corresponding to the like named control variables of the function block 88. This linkage is implicit in the fact that both of the program fragments were in the same object template 86 and have the control variables with the same root names.

Referring to FIGS. 3 and 8, HMI program 50 may be developed per process block 109 of FIG. 3 by using an HMI integration wizard 57 which receives the wizard file 100 and the object templates 86 of the library 58. When each HMI program fragment, for example, a GFX file from the wizard file 100 is selected for instantiation into the control program copy 34', its associated parameter file: e.g., "panel PAR", is updated so that the default value 95 includes the hierarchy established by the area-model 55 as reflected in the wizard file 100. For example, in the case of an HMI program fragment associated with equipment "tank 1" and the phase of operation "agitate" the default value changes from "motor" to become "tank1\agitate\motor". The default value is used to rename the variable 92 prior to the collection of the HMI controls 90- into the HMI program 50 according to process block 11 of FIG. 3. This default value 95 forms a prefix for each of the variables 92 of the HMI program fragment. Accordingly, the "panel.GFX" program file, providing HMI functions, is automatically connected with the program fragment "motor DAF" even after it has been instantiated into the control program copy 34' under the "tank1" and its variables renamed.

Therefore, the library 58, together with the wizard file 100, allows the variable names of the multiple program fragments of an object template to be correctly updated in unison according to linkages to the area-model 55 established by the user. In particular, the user may select a particular HMI control displayed graphically, for example, that indicated by entry 112 in the wizard file 100 and drag it to a workspace 110 whereupon the graphic representing the control becomes apparent and the connections are established by the updating of the parameter file. The updating of the parameter file simply follows the path from the program fragment in the wizard file 100 through the hierarchy of the wizard file 100 to concatenate names of the overarching phase of operation and equipment into the tag that will be used to identify the control variables. In this manner, essentially automatic connection may be had between the HMI program and the underlying control program.

It will be understood that multiple instances of an HMI control such as the panel 102 may be created for the multiple instances of a "motor.DAF" or similar control program fragment and that, on the other hand, not all control program fragments may have HMI controls associated with them. Further, it is possible that multiple HMI controls may be associated with a particular control program fragment. It will be recognized further that this technique is not limited to connecting HMI controls to control program fragments, but may be also used to connect different control program fragments together according to common shared variables. In each case, the proper denotation of the control variables of the program fragments is automatically performed according to the area-model 55.

In summary, by collecting together within a library heading various different types of programs, an implicit linkage between those program control variables may be established indicating the propriety of assuming that control variables of the same name are in fact the same control variable. This allows later interconnection of the different program fragments even after they have been multiple instants and renamed to create an overarching control program. A significant problem in integrating the HMI aspect of a control program with the control program is ensuring that the variable names still match after the renaming incident to multiple instancing of the control program fragments. The use of a library system in which these disparate elements of a control program are held together in a single file allows the renaming process of the control program fragments to be reproduced at a later time for the HMI process fragments or other program fragments allowing them to be reconnected without undue programmer effort.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

We claim:

1. A library system for creating programs executable on an industrial controller to control an industrial process, the library system comprising:
    a library manager collecting in unique files, at least first and second program fragments having shared control variables determining physical inputs or outputs exchanged with the industrial process, the shared control variables having common tags;
    a first program builder accepting user input to link in a first linking process instances of first program fragments from files in the library manager together to create a first portion of the control program; the first program builder renaming tags of control variables of duplicate instances of first program fragments to be unique; and
    a second program builder accepting information about the first linking process, and user input, to create a second portion of the control program from second program fragments taken from the same files of the first program fragments used in the first portion of the control program, the second program builder renaming the tags of the control variables of the second program fragments to comport with the renaming of the tags of the control variables of the first portions by the first program builder;
    whereby the second program fragments can communicate with the multiple instances of the first program fragments through common tags.

2. The library system of claim 1 wherein the first program fragments provide control logic for industrial control and the second program fragments provide visualization of industrial control.

3. The library system of claim 1 wherein the renaming of the first and second program fragments incorporate at least a portion of a name of their unique file of the library manager into the tags of the renamed first and second program fragments.

4. The library system of claim 1 wherein the library manager holds at least two first program fragments having shared control variables with a second program fragment.

5. The library system of claim 4 wherein the second program builder accepts user input to select from among the at least two first program fragments, a first program fragment with which the renaming of the tags of the control variable of the second program fragment will comport.

6. The library system of claim 5 wherein the second program builder provides at least one menu providing representations of first and second program fragments related to a common file of the library manager and wherein the user input for creating a second portion of the control program selects representations of the program fragments from the menu.

7. The development system of claim 6 wherein the menu depicts the first program fragments as dependent on particular items of physical equipment of the controlled process.

8. The library system of claim 1 wherein the library manager holds at least two second program fragments having shared control variables with a first program fragment.

9. The library system of claim 8 wherein the second program builder accepts user input to select from among the two second program fragments, a second program fragment with which the renaming of the tags of the control variables of the second program fragment to a first program fragment will comport.

10. The library system of claim 9 wherein the second program builder provides at least one menu providing representations of first and second program fragments related to common files of the library manager and wherein the user input for creating a second portion of the control program selects representations of the program fragments from the menu.

11. The development system of claim 10 wherein the menu depicts the first program fragments as dependent on particular items of physical equipment of the controlled process.

12. The library system of claim 1 wherein the files of the library manager denote phases of operation of a machine of the controlled process and wherein the files also include information related to the phase of operation denoted by the file but not a program fragment.

13. The library system of claim 1 wherein the first program fragments are written in a language selected from the group consisting of: function block language, structured text language, ladder logic language and sequential function chart language.

14. The library system of claim 1 wherein the renaming is performed by concatenating a unique identifier onto the tag of the control variable.

15. The library system of claim 1 wherein the files of the library manager are identified to equipment of the controlled process.

16. A library system for creating programs executable on an industrial controller to control an industrial process, the library system comprising:
 a library manager collecting in unique files, first and second program fragments having shared control variables representing physical inputs or outputs exchanged with the industrial process, the shared control variables having common tags;
 a first program builder accepting user input to link in a first linking process instances of first program fragments from files in the library manager together to create a first portion of the control program; the first program builder renaming tags of control variables of duplicate instances of first program fragments to be unique; and
 a second program builder accepting information identifying the files of the library manager from which the instances of the first program fragments originated to display to a user second program fragments related to each instance of the first program fragments according to common library files, and accepting user input to select among the displayed second program fragments to create a second portion of the control program from second program fragments, the second program builder renaming the tags of the control variables of the second program fragments to comport with the renaming of the tags of the control variables of the first portions by the first program builder;
 whereby second program fragments that can communicate with the multiple instances of the first program fragments through common tags are identified and utilized.

17. The library system of claim 16 wherein the first program fragments provide control logic for industrial control and the second program fragments provide visualization of industrial control.

18. The library system of claim 16 wherein the renaming of the first and second program fragments incorporate a common name of their unique file of the library manager.

19. A system for creating a program, the system comprising:
 a library having two pairs of program fragments stored in two library subportions, wherein one of the program fragments of each pair is of a first type and another of the program fragments of each pair is of a second type; and
 a device capable of distinguishing both among the pairs of program fragments and among the program fragments of different types;
 wherein the program is created in at least first and second stages during which, respectively, the program fragments of the first and second types are instantiated; and
 wherein, during the second stage, the device identifies the program-fragments of the second type that correspond to the program fragments of the first type that were instantiated during the first stage, based upon the library subportions in which the program fragments are stored.

20. The system of claim 19, wherein the instantiation of each of the program fragments includes modifying at least one variable associated with the respective program fragment so that the variable reflects an entity with which the program fragment has been associated in accordance with a user command.

21. The system of claim 20, wherein the instantiation of the program fragments of the second type includes modifying the variables associated with the respective program fragments of the second type so that the variables respectively conform to the respective variables of the respective program fragments of the first type that were already instantiated.

22. A method of creating a program comprising:
 providing a library storing a plurality of program fragments respectively within a plurality of library subportions, wherein at least some of the library subportions include a program fragment of a first type and a program fragment of a second type;
 receiving commands to link instances of the program fragments of the first type with one another to form a control program;
 instantiating the program fragments of the first type about which the commands were received, wherein the instantiating includes modifying variables of those program fragments;
 identifying program fragments of the second type corresponding to the instantiated program fragments of the first type based upon the library subportions within which the program fragments are stored; and
 instantiating the program fragments of the second type, wherein the instantiating includes modifying additional variables of those program fragments so that those variables conform with the variables of the corresponding instantiated program fragments of the first type.

23. The method of claim 22, wherein the program fragments of the first type provide control logic for industrial control and the program fragments of the second type provide visualization of industrial control.

24. A method of creating a program comprising:
 providing a library storing a plurality of program fragments stored within a plurality of library subportions;
 providing a model having hierarchically-ordered entities each of which respectively represents at least one of a component of a system and a process of the system;
 receiving commands to associate at least some of the program fragments with the hierarchically-ordered entities; and
 instantiating the program fragments about which the commands were received, wherein the instantiating of the program fragments automatically results in establishment of operational connections among the program fragments associated with the different entities.

25. The method of claim 24, wherein the instantiating includes modifying variables of the program fragments in a manner signifying the entities with which the program fragments have been associated.

26. The method of claim 25;
 wherein at least some of the library subportions include program fragments of both first and second types, and wherein when first and second program fragments of the first and second types, respectively, are instantiated in association with the same entity, the variables of the first and second program fragments are modified in a common manner that allows for operational connections to be achieved between those first and second program fragments.

27. A method of creating a program for execution on at least one industrial controller for controlling an industrial process, the method comprising:

providing a control program formed from a plurality of primary program fragments that have been instantiated, wherein the instantiated primary program fragments are respectively associated with respective process components that can be represented by elements in a model;

identifying a plurality of secondary program fragments stored within a plurality library subportions of a library that correspond to the instantiated primary program fragments within the control program, wherein correspondences between the program fragments are determined based upon whether the primary and secondary program fragments are stored within the same library subportions; and instantiating at least some of the plurality of secondary program fragments so that the instantiated secondary program fragments are operationally connected to the instantiated primary program fragments.

28. The method of claim 27, wherein the instantiating includes modifying variables of the secondary program fragments in a same manner as corresponding variables of the corresponding primary program fragments were modified to arrive at the control program.

29. The method of claim 27, further comprising:

displaying the secondary program fragments stored within at least some of the library subportions that correspond to the instantiated primary program fragments; and receiving user inputs selecting at least some of the secondary program fragments, which causes the instantiating of those secondary program fragments.

30. A library system for creating programs executable on an industrial controller to control an industrial process, the library system comprising:

a library manager collecting in unique files, at least first and second program fragments having shared control variables determining physical inputs or outputs exchanged with the industrial process, wherein the first program fragments are control logic program fragments that provide control logic for industrial control and the second program fragments are human machine interface (HMI) program fragments that enable visualization of industrial control, and wherein the shared control variables have common tags;

a first program builder accepting user input to link in a first linking process instances of first program fragments from files in the library manager together to create a first portion of a control program, wherein the first portion is a control logic portion of the control program, and wherein the first program builder renames tags of control variables of duplicate instances of the first program fragments to be unique; and a second program builder accepting information about the first linking process, and user input, to create a second portion of the control program from second program fragments taken from the files from which the first program fragments used in the first portion of the control program were taken, wherein the second portion is a HMI program portion of the control program, and wherein the second program builder renames the tags of the control variables of the second program fragments to comport with the renaming of the tags of the control variables of the first portion by the first program builder;

whereby the second program fragments can communicate with the multiple instances of the first program fragments through common tags.

* * * * *